(12) United States Patent
Kim et al.

(10) Patent No.: US 7,270,364 B1
(45) Date of Patent: Sep. 18, 2007

(54) DOOR BEAM FOR MOTOR VEHICLE

(75) Inventors: Chongmin Kim, Bloomfield Township, MI (US); Michael L. Wenner, Oakland, MI (US); Charles J. Bruggemann, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/669,971

(22) Filed: Feb. 1, 2007

(51) Int. Cl.
*B60R 21/02* (2006.01)
(52) U.S. Cl. .................. 296/146.6; 296/187.12
(58) Field of Classification Search ............. 296/146.6, 296/187.12
See application file for complete search history.

(56) References Cited

U.S. PATENT DOCUMENTS

| | | | |
|---|---|---|---|
| 5,238,289 A | 8/1993 | Pitzer et al. | 296/146.6 |
| 5,277,469 A | 1/1994 | Klippel | 296/146.6 |

*Primary Examiner*—Joseph D. Pape

(57) ABSTRACT

A door beam arrangement is provided for a vehicle door having a door panel with a hinge mounting flange and a latch mounting flange. A first hollow tube of high-strength steel has one end fixedly mounted on one of the flanges, and a second end. A second hollow tube of a non-ferrous material has one end fixedly mounted on the other of the flanges and is of smaller diameter than the first hollow tube and inserted into the first hollow tube and is slidable therein to accommodate variations in the distance between the hinge mounting flange and the latch mounting flange.

18 Claims, 2 Drawing Sheets

DOOR BEAM FOR MOTOR VEHICLE

FIELD OF THE INVENTION

The present invention relates to a door beam for a motor vehicle door and more particularly a door beam of light weight and improved strength and energy absorption at any ambient temperature.

BACKGROUND OF THE INVENTION

It is known in motor vehicles to provide a door having a front flange that is connected to a front pillar by a pair of hinges and a rear flange that carries a door latch for latching the door to the rear pillar of the vehicle body. It is also known to provide a beam which extends within the door from the front flange to the rear flange to resist intrusion into the passenger compartment.

It would be desirable to provide an improved door beam construction of high strength, low weight and having the ability to accommodate the dimensional change that results from the affects of wide variation in ambient temperature on the various ferrous, non-ferrous and plastic materials that are commonly employed in the manufacture of modern vehicle body and vehicle door systems.

SUMMARY OF THE INVENTION

A door beam arrangement is provided for a vehicle door having a door panel with a hinge mounting flange and a latch mounting flange. A first hollow tube of high-strength metal has one end mounted on one of the flanges. A second hollow tube of another material has one end mounted on the other of the flanges and is of smaller diameter than the first hollow tube and inserted into the first hollow tube and is slidable therein to accommodate variations in the distance between the hinge mounting flange and the latch mounting flange.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
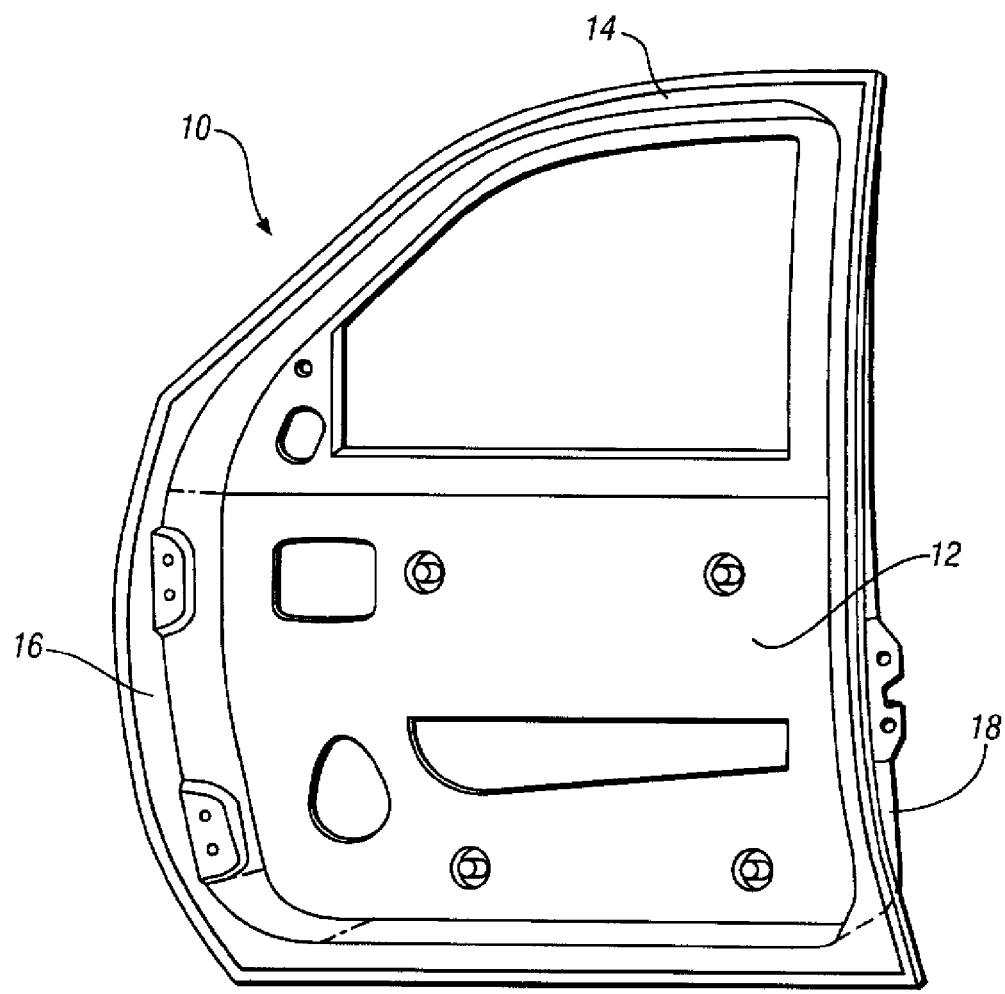
FIG. 1 is a perspective view of a vehicle door inner panel.

Referring to FIG. 1 a vehicle door inner panel 10 is shown and includes a central panel portion 12, and a window frame 14. A hinge flange 16 projects laterally form the central panel portion 12 at the front thereof and a latch flange 18 projects laterally from the central panel portion 12 at the rear thereof. The door inner panel 10 may be constructed of ferrous metal, non-ferrous metal, or plastic or composite material.

Figure 2:
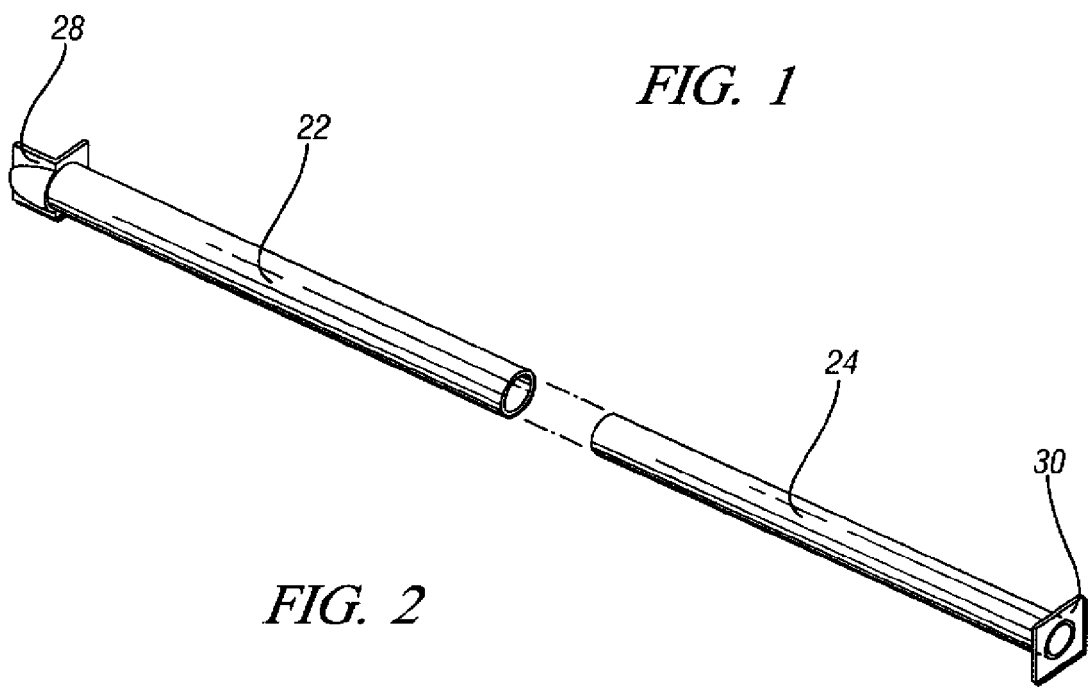
FIG. 2 is a perspective view of a door beam for installation in the door inner panel of FIG. 1.

Referring to FIG. 2, a door beam assembly 20 is shown and includes a pair of tubes 22 and 24. The tube 22 is DP600 steel and has a 30 mm. inside diameter and a 32 mm. outside diameter. A front bracket 28, also of steel construction, is welded or otherwise attached to the front end of the tube 22. The tube 24 is 6061-T6 aluminum and has an inner diameter of 26 mm. and an outside diameter of 30 mm. A rear bracket 30 of aluminum is welded or otherwise attached to the rear end of the tube 24.

Figure 3:
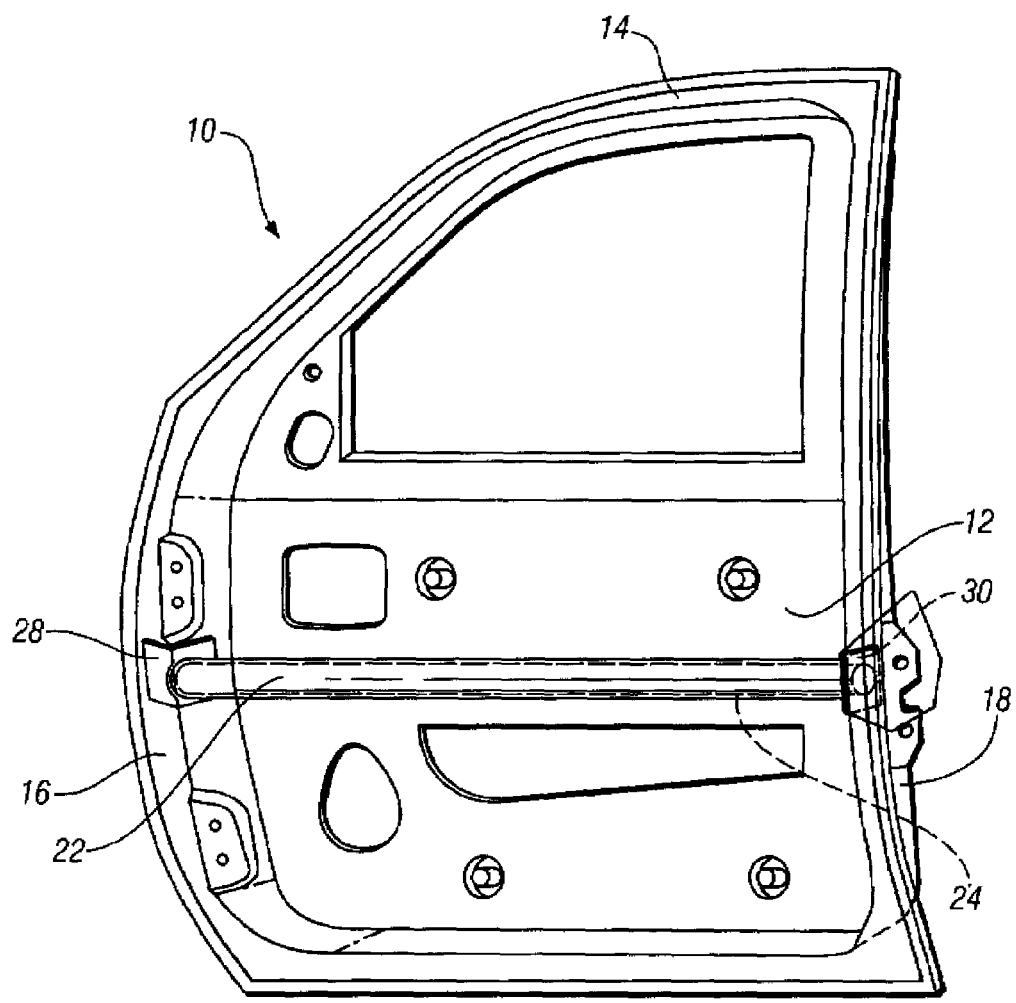
FIG. 3 is a perspective view showing the door beam installed in the door inner panel; and, FIG. 4 is a plot of force versus deflection comparing the door beam of this invention with other door beams.

As shown in FIG. 3, the door beam assembly 20 is installed into the door inner panel 10 by sliding the tube 24 inside the tube 22, welding or otherwise attaching the front bracket 28 to the front flange 16, and welding or otherwise attaching the rear bracket 30 to the rear flange 18. The bending resistance of the door beam assembly can be maximized by having both of the tubes 22 and 24 be of a maximum length so as to maximize the overlap of the tubes 22 and 24.

In use, the tubes 22 and 24 can slide relative one another to accommodate the different rate of thermal expansion between the differing materials of the door inner panel 10, the tube 22 and the tube 24. In order to promote sliding of the tubes 22 and 24 and to prevent galvanic action between the steel and aluminum of the tubes, the steel tube 22 may be galvanized or otherwise coated with zinc. Grease or a solid lubricant such as molybdenum disulphide or graphite can be used.

Figure 4:
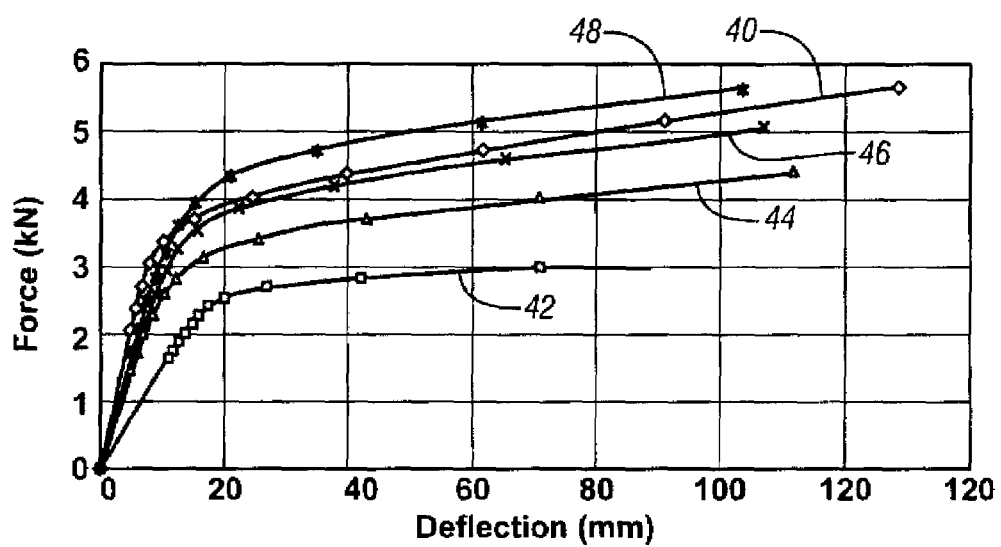

The use of aluminum for the inner tube 24 and steel for the outer tube 22 provides benefits of higher strength and lower weight than a corresponding beam of alternative construction. FIG. 4 shows several examples. The base line construction shown in curve 40 is a one piece steel tube of DP-600 steel having an inner diameter of 28 mm. and an outer diameter of 32 mm. This all steel tube is known to provide sufficient strength to comply with the applicable safety standards but has the disadvantage of being relatively heavy.

The curve 42 shows the force versus deflection characteristic of an all aluminum door beam made of 6061-T6 aluminum having an inside diameter of 28 mm. and outside diameter of 32 mm. Although this all aluminum construction is very lightweight, it does not meet the force requirements.

Curve 44 shows a door beam with an aluminum inner tube of 28-mm. inner diameter and outer diameter of 30 mm. which slides in an outer tube of steel with a 30 mm. inside diameter and 32 mm. outside diameter. This construction provides a savings of 33% as compared to the base line all steel construction of curve 40, but does not meet the force requirements.

Curve 46 is another sliding tube arrangement in which the inner aluminum tube has a 27-mm. inner diameter and a 30 mm. outer diameter. The outer steel tube has a 30-mm. inner diameter and a 32-mm. outer diameter. This construction has a weight saving of 25% compared to the base line all steel construction of curve 40 and is closer in strength than the other alternative constructions.

Curve 48 shows the performance of the construction shown in the drawings and described above. The inner tube 22 is aluminum and has an inside diameter of 30 mm. and an outside diameter of 32 mm. The outer tube 24 is of steel and has an inside diameter of 26 mm. outside diameter of 30 mm. As shown in FIG. 4, this construction is even stronger than the base line all steel construction and has a 17% weight advantage.

The foregoing description of the invention is merely exemplary in nature and, thus, variations thereof are intended to be within the scope of the invention. Although aluminum is used for the inside tube in the drawing, it will be understood that other non-ferrous metals and alloys such as magnesium may also be employed. In general, the outer tube is constructed of a material having high tensile and fracture strengths and suitable ductility, while the inner tube is constructed of a material of low weight and providing stiffness to the outer tube.

What is claimed is:

1. A door beam arrangement for a vehicle door having a door panel with a hinge mounting flange and a latch mounting flange, comprising:
   a first hollow tube of high-strength steel having one end fixedly mounted on one of the flanges, and a second end;
   a second hollow tube of a non-ferrous material and having one end fixedly mounted on the other of the flanges and being of smaller diameter than the first hollow tube and inserted into the first hollow tube and being slidable therein to accommodate variations in the distance between the hinge mounting flange and the latch mounting flange.

2. The door beam arrangement of claim 1 further comprising the second hollow tube being of aluminum.

3. The door beam arrangement of claim 1 further comprising a grease coating the sliding surfaces of the first hollow tube and the second hollow tube.

4. The door beam arrangement of claim 1 further comprising a zinc coating on the inside of the first hollow tube.

5. The door beam arrangement of claim 1 further comprising a first mounting bracket fixedly mounting the first hollow tube on one of the flanges and a second mounting bracket fixedly mounting the second hollow tube on the other of the flanges.

6. A door beam arrangement for a vehicle door having a door panel with a hinge mounting flange and a latch mounting flange, comprising:
   a first hollow tube of high-strength steel having one end fixedly mounted on one of the flanges, and a second end;
   a second hollow tube of aluminum having one end fixedly mounted on the other of the flanges and being of smaller diameter than the first hollow tube and inserted into the first hollow tube and being slidable therein to accommodate variations in the distance between the hinge mounting flange and the latch mounting flange,
   and a corrosion preventing coating provided on at least one of the tubes.

7. The door beam arrangement of claim 6 further comprising a grease coating the sliding surfaces of the first hollow tube and the second hollow tube.

8. The door beam arrangement of claim 6 further comprising a zinc coating on the inside of the steel first hollow tube.

9. The door beam arrangement of claim 6 further comprising a first mounting bracket fixedly mounting the first hollow tube on the one of the flanges and a second mounting bracket fixedly mounting the second hollow tube on the other of the flanges.

10. A door beam arrangement for a vehicle door having a door panel with a hinge mounting flange and a latch mounting flange, comprising:
    a first mounting bracket fixedly mounting a first end of a steel tube on one of the flanges;
    a second mounting bracket fixedly mounting a first end of an aluminum tube on the other of the flanges;
    said aluminum tube being of smaller diameter than the steel tube and sliding therein to accommodate variations in the distance between the hinge mounting flange and the latch mounting flange.

11. The door beam arrangement of claim 10 further comprising said aluminum hollow tube being of 6061-T6 aluminum with an inside diameter of 26 mm and an outside diameter of 30 mm.

12. The door beam arrangement of claim 10 further comprising said steel tube being of DP600 steel with an inside diameter of 30 and an outside diameter of 32 mm.

13. The door beam arrangement of claim 10 further comprising a grease coating the sliding surfaces of the steel hollow tube and the aluminum hollow tube.

14. The door beam arrangement of claim 12 further comprising a zinc coating on the inside of the steel hollow tube.

15. The door beam arrangement of claim 12 further comprising the steel tube being of DP600 steel with an inside diameter of 30 mm. and an outside diameter of 32 mm, and the aluminum hollow tube being of 6061-T6 aluminum with an inside diameter of 26 mm and an outside diameter of 30 mm.

16. The door beam arrangement of claim 15 further comprising a grease coating the sliding surfaces of the steel hollow tube and the aluminum hollow tube.

17. The door beam arrangement of claim 15 further comprising a zinc coating on the inside of the steel hollow tube.

18. The door beam of claim 15 in which each of the tubes is of maximum length to obtain maximal overlap of the tubes.

* * * * *